(12) United States Patent
Kraft (10) Patent No.: US 10,258,104 B2
(45) Date of Patent: Apr. 16, 2019

(54) SOLE FOR A SHOE

(71) Applicant: adidas AG, Herzogenaurach (DE)

(72) Inventor: Ulrike Elisabeth Kraft, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 48 days.

(21) Appl. No.: 14/872,723

(22) Filed: Oct. 1, 2015

(65) Prior Publication Data

US 2016/0095384 A1   Apr. 7, 2016

(30) Foreign Application Priority Data

Oct. 1, 2014   (DE) ........................ 10 2014 219 918

(51) Int. Cl.
| | | |
|---|---|---|
| A43B 13/22 | (2006.01) | |
| A43B 13/04 | (2006.01) | |
| B29D 35/12 | (2010.01) | |
| A43B 13/12 | (2006.01) | |
| A43B 13/18 | (2006.01) | |
| B29D 35/00 | (2010.01) | |

(52) U.S. Cl.
CPC ............ *A43B 13/122* (2013.01); *A43B 13/04* (2013.01); *A43B 13/12* (2013.01); *A43B 13/184* (2013.01); *A43B 13/223* (2013.01); *B29D 35/0009* (2013.01); *B29D 35/0054* (2013.01); *B29D 35/122* (2013.01)

(58) Field of Classification Search
CPC ... A43B 13/223; A43B 13/184; A43B 13/122; A43B 13/04; A43B 13/12
See application file for complete search history.

(56) References Cited

U.S. PATENT DOCUMENTS

| | | | | |
|---|---|---|---|---|
| 354,232 | A | * 12/1886 | Reid | ................... A43B 13/223 36/59 A |
| 2,333,303 | A | 11/1943 | Enos | |
| 2,364,134 | A | 12/1944 | Dildilian et al. | |
| 2,557,946 | A | 6/1951 | Crooker | |
| 4,494,320 | A | * 1/1985 | Davis | .................. A43B 13/184 36/103 |
| 5,237,758 | A | 8/1993 | Zachman et al. | |

(Continued)

FOREIGN PATENT DOCUMENTS

| | | |
|---|---|---|
| CN | 102125330 | 7/2011 |
| CN | 202385848 | 8/2012 |

OTHER PUBLICATIONS

Chinese Patent Application No. 20150621668.2, Office Action dated Dec. 8, 2016, 7 pages pages (No English transtation available. A Summary of the Office Action is provided in the Transmittal Letter submitted herewith).

(Continued)

*Primary Examiner* — Jila M Mohandesi
(74) *Attorney, Agent, or Firm* — Kilpatrick Townsend & Stockton LLP (57) ABSTRACT

Described are soles for shoes, in which the sole includes a porous mesh and a continuous first layer arranged at least partially on a first side of the porous mesh, wherein the first layer penetrates the porous mesh at least partially to form a tread structure on a second side of the porous mesh opposite the first side, and wherein the first layer and the porous mesh are bonded at least in an area where the tread structure is formed.

19 Claims, 7 Drawing Sheets

(56) References Cited

U.S. PATENT DOCUMENTS

| | | | |
|---|---|---|---|
| 6,032,388 A | 3/2000 | Fram et al. | |
| 6,508,015 B1* | 1/2003 | Rauch | A43B 7/06 |
| | | | 36/3 B |
| 6,557,274 B2* | 5/2003 | Litchfield | A43B 1/0072 |
| | | | 36/29 |
| 6,782,642 B2* | 8/2004 | Knoche | A43B 1/0009 |
| | | | 36/129 |
| 7,367,141 B2* | 5/2008 | Polegato Moretti | A43B 13/16 |
| | | | 36/3 B |
| 7,788,827 B2* | 9/2010 | Fogg | A43B 3/128 |
| | | | 36/103 |
| 8,029,715 B2* | 10/2011 | Fogg | A43B 3/128 |
| | | | 12/142 RS |
| 8,197,736 B2* | 6/2012 | Frasson | A43B 13/24 |
| | | | 264/244 |
| 9,516,917 B2* | 12/2016 | Hoffer | A43B 13/122 |
| 2006/0225305 A1 | 10/2006 | Morgan et al. | |
| 2008/0216357 A1* | 9/2008 | Fogg | A43B 3/128 |
| | | | 36/25 R |
| 2008/0263905 A1 | 10/2008 | Tai et al. | |
| 2009/0211119 A1* | 8/2009 | Moretti | A43B 7/06 |
| | | | 36/3 B |
| 2011/0192056 A1* | 8/2011 | Geser | A43B 13/26 |
| | | | 36/114 |
| 2013/0019505 A1* | 1/2013 | Borel | A43B 13/127 |
| | | | 36/103 |
| 2013/0036633 A1* | 2/2013 | Lee | A43B 3/02 |
| | | | 36/25 R |
| 2014/0259747 A1* | 9/2014 | Baudouin | A43B 13/181 |
| | | | 36/29 |

OTHER PUBLICATIONS

European Application No. 15187062.3, Extended European Search Report dated Feb. 25, 2016, 7 pages.

German Patent Application No. 102014219918.2, Office Action dated Jul. 21, 2015, 6 pages (No English translation available. A summary of the Office Action is provided in the accompanying Transmittal).

German Patent Application No. 102014219918.2, Decision to Grant dated Sep. 9, 2016, 26 pages (13 pages for the English Translation and 13 pages for the original German document).

Chinese Application No. 201510621668.2, Office Action dated Apr. 10, 2018, 7 pages (No English translation available. A summary of the Office Action is provided in the Transmittal Letter submitted herewith).

* cited by examiner

FIG 7b
Section B-B

FIG 7c
Section C-C

SOLE FOR A SHOE

CROSS REFERENCE TO RELATED APPLICATION

This application is related to and claims priority benefits from German Patent Application No. DE 10 2014 219 918.2, filed on Oct. 1, 2014, entitled Sole for a Shoe ("the '918 application"). The '918 application is hereby incorporated herein in its entirety by this reference.

FIELD OF THE INVENTION

The present invention is directed to a sole for a shoe.

BACKGROUND

Shoes, in particular sports shoes, usually comprise a sole and a shoe upper attached to the sole. The sole is usually made from an abrasion-resistant and nonskid material such as rubber or similar and can be provided with a tread to improve traction. Such a sole is also referred to as an outsole, because it engages the ground. The outsole can be the only sole provided with the shoe. However, to improve damping properties, especially with sports shoes, a sole of a shoe can be provided with a midsole arranged on top of the outsole and being made of a shock-absorbing material such as rubber, ethylene vinyl acetate (EVA) or similar. Thus, a sole may either comprise just an outsole or may comprise a midsole in addition.

While rubber can be made abrasion-resistant and nonskid by a special treatment and is shock-absorbing to some degree like EVA, the soles (i.e. the outsoles or the combination of outsoles and midsoles) of shoes tend to have rather large weights to provide for abrasion-resistance, traction and damping. While the latter properties are desirable, the weight of shoes, especially sports shoes, should be as small as possible to allow for natural motions and, in the case of sports shoes, maximum performance of an athlete. Running shoes for example must be abrasion-resistant and provide damping and traction. However, it is not acceptable, if these objectives can only be fulfilled by increasing the weight of the running shoes to such an extent that the athlete fatigues.

U.S. Pat. No. 6,782,642 B2 relates to an article of footwear with a sole including a mesh layer at least partially embedded in the sole layer. The mesh extends along and is substantially coterminous, i.e. flush, with a bottom surface of the sole layer. The mesh provides traction for the wearer and abrasion resistance for the sole.

U.S. Pat. No. 2,557,946 relates to a nonskid rubber sole with an outer surface formed with transverse ribs spaced apart by transverse grooves. Extending longitudinally preferably within each of the transverse ribs is a helical coil.

U.S. Pat. No. 5,237,758 is directed to a safety shoe with a shoe upper extending upwardly of the shoe sole. The shoe sole includes at least one metallic fabric mesh web projected substantially coextensive through the shoe sole to minimize puncturing and projecting of the shoe sole.

U.S. Pat. No. 2,364,134 relates to soles for footwear comprising a single sheet of fabric which is filled on at least one side by a plastic material applied thereto. The fabric is preferably a woven fabric which is formed of sets of weft and sets of warp threads, some of the latter being of comparatively light weight, but at least one of the sets of warps being of comparatively heavy strong yarns or cords having nubs formed of loops which protrude at least on the side of the fabric which is to form the tread of the sole.

U.S. Pat. No. 2,333,303 is directed to a shoe having an impregnated fabric. The fabric is impregnated from one surface thereof and partially therethrough with a flexible adhesive binder. The impregnating material may comprise any flexible adhesive binder including rubber, latex, rubber compositions, synthetic rubber, and other plastic materials.

U.S. Pat. No. 6,032,388 relates to an outsole for a shoe formed from a thin, flexible, nonporous and inelastic material having a pattern of perforations through it, and a plurality of tread elements of a hard, wear-resistant material molded onto a first side of the sheet material by a process in which the tread forming material is injected through the perforations in a manner such that at least some of the resultant tread elements have anchoring portions extending through the perforations from an opposite second side of the sheet material, a portion of the sheet material around the perforations being held between the tread elements and the anchoring portions.

The soles for shoes known in the prior art are comparatively heavy in order to provide durability, stability and traction. It is therefore the underlying problem of the present invention to provide for a sole for a shoe, which is lightweight, yet abrasion-resistant and durable and provides for good traction. A further object of the invention is to provide a shoe, which is lightweight, yet abrasion-resistant and durable and provides for good fraction and stability for the foot of a wearer.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a sole for a shoe comprises a porous mesh, a continuous first layer at least partially arranged on a first side of the porous mesh, wherein the first layer at least partially penetrates the porous mesh to form a tread structure on a second side of the porous mesh, and wherein the first layer and the porous mesh are bonded at least in an area where the tread structure is formed.

The sole may further comprise a second layer arranged on the second side of the porous mesh, wherein the second layer comprises at least one aperture in which the tread structure is at least partially arranged, and wherein the second layer and the first layer are at least partially bonded. In some embodiments, the second layer is made of rubber.

The sole may further comprise a continuous third layer arranged on the first layer, wherein the third layer comprises a different material than the first layer, and wherein the third layer and the first layer are at least partially bonded. In some embodiments, the third layer is made of ethylene vinyl acetate, polyurethane, or a combination thereof.

In certain embodiments, the first layer is made of rubber. The porous mesh may be made of metal, plastic, fabric, or a combination thereof.

In some embodiments, the tread structure comprises tread elements. The average size of mesh openings formed by mesh fibers in the porous mesh may be smaller than an average size of the tread elements.

The sole may further comprise gaps located between the tread elements, wherein the porous mesh is visible through the gaps.

In some embodiments, material of the first layer at least partially fills mesh openings of the porous mesh in the area where the tread structure is formed.

The sole may be configured to be used for a sports shoe. In these embodiments, the sports shoe may be a running or tennis shoe.

According to certain embodiments, a shoe comprises a sole comprising a porous mesh, and a first layer at least partially arranged on a first side of the porous mesh, wherein the first layer at least partially penetrates the porous mesh to form a tread structure on a second side of the porous mesh opposite the first side, and wherein the first layer and the porous mesh are bonded at least in an area where the tread structure is formed, and a shoe upper connected to the sole.

In some embodiments, the porous mesh extends into the shoe upper. The porous mesh may further form a part of the shoe upper.

According to certain embodiments, a method of manufacturing a shoe as described above comprises connecting the shoe upper to the sole. Such a method may further comprise connecting the shoe upper to the sole via the porous mesh.

According to certain embodiments of the present invention, a method of manufacturing a sole comprising a porous mesh and a continuous first layer comprises arranging the first layer at least partially on a first side of the porous mesh, and molding the first layer and the porous mesh, such that the first layer at least partially penetrates the porous mesh to form a tread structure on a second side of the porous mesh, wherein the first layer and the porous mesh are bonded at least in an area where the tread structure is formed.

In some embodiments, the step of molding comprises compression molding or injection molding. The method may further comprise arranging a second layer on the second side of the porous mesh, wherein the second layer comprises at least one aperture in which the tread structure is at least partially arranged.

The method may still further comprise arranging a continuous third layer on the first layer, wherein the third layer comprises a different material than the first layer, and at least partially bonding the third layer and the first layer.

BRIEF DESCRIPTION OF THE DRAWINGS

In the following detailed description, embodiments of the invention are described referring to the following figures:

FIGS. 7b and 7c are schematic cross sectional views of the shoe of FIG. 7a.

FIG. 7d is a schematic bottom view of the shoe of FIG. 7a.

BRIEF DESCRIPTION

According to a first aspect of the present invention, the above mentioned problem is solved by a sole for a shoe, comprising a porous mesh and a continuous first layer arranged at least partially on a first side of the porous mesh, wherein the first layer penetrates the porous mesh at least partially to form a tread structure on a second side of the porous mesh opposite the first side, and wherein the first layer and the porous mesh are bonded at least in an area where the tread structure is formed.

By using a mesh which is bonded to the first layer the inventive shoe sole becomes very stable and durable. These properties are further improved by having the first layer penetrate the porous mesh at least partially. In this way, a very stable and secure bond is achieved between the mesh and the first layer. Compared to conventional soles for sports shoes, less material, e.g. rubber, is needed to achieve the desired level of stability and durability. Hence, the shoe sole may be lightweight. Furthermore, as less material is needed, the manufacturing costs are reduced as well.

At the same time, the shoe sole provides for maximum traction. This is achieved by having the first layer form a tread structure where it penetrates the porous mesh. Thus, shearing and tension forces during use are dissipated by the tread structure and the mesh. The embedded mesh which is in immediate contact with the tread structure provides the shoe sole with a very high elastic modulus (ratio of stress over strain) and a very high shear modulus (response to shear stress). Again, material and costs can be saved compared to conventional shoe soles to achieve these advantages.

"Sole" in the context of the present invention is understood as either an outsole or a combination of outsole and midsole.

The sole may comprise a second layer arranged on the second side of the porous mesh, wherein the second layer comprises at least one aperture in which the tread structure is arranged at least partially, and wherein the second layer and the first layer are bonded at least partially. In this way, the second layer provides further support for the tread structure and adds to the overall stability and durability of the sole by bonding at least partially to the first layer. Such an arrangement may be desirable for curved soles.

The sole may comprise a continuous third layer arranged on the first layer comprising a different material than the first layer, wherein the third layer and the first layer are bonded at least partially. The third layer adds to the overall stability of the sole. Alternatively or in addition, the third layer may provide further functions to the sole, e.g. damping or thermal insulation.

The first layer may be made of rubber. Rubber is inexpensive and can be easily formed e.g. by molding under heat and/or pressure. Furthermore, rubber provides for abrasion and skid resistance.

In general, the first layer may be made of a thermoset or a thermoplastic material.

The mesh may be made of metal, plastic, fabric or textile. These materials provide the sole with stability, durability and high shearing and elastic moduli.

The second layer may be made of rubber. As explained above, rubber is inexpensive and can be easily formed e.g. by molding under heat and/or pressure. Furthermore, rubber provides for abrasion and skid resistance.

The third layer may be made of ethylene vinyl acetate, EVA. EVA has good damping properties and, thus may avoid or at least decrease shocks which occur especially during sports such as running or basketball. By integrating the EVA layer directly in one single sole structure comprising the mesh, the first layer (and optionally the second layer) and the third layer, a separate midsole could be dispensed with. The EVA layer may be co-molded or injection molded with the first layer and the mesh after the first layer with the mesh has cured. An integrated EVA layer in the sole may be desirable for flat soles.

The tread structure may comprise tread elements. Such tread elements engage the ground and discharge forces during use immediately to the mesh.

The average size of the mesh openings formed by mesh fibers may be smaller than the average size of the tread elements. In this way, each tread element penetrates a large number of mesh openings resulting in a very stable and durable connection of the tread elements with the mesh. "Size" in this context is understood as diameter or length depending on whether the mesh openings and/or tread elements have a more round or elongated shape.

The tread elements may have gaps in between, and the porous mesh may be visible through the gaps. Such an arrangement may not only add to the overall visual appearance of the sole, but may also result in a deeper profile of the sole, thus increasing traction especially on muddy surfaces or snow.

The material of the first layer may fill the mesh openings of the porous mesh in the area of the tread structure at least partially. In this way, a stable bond is achieved between the tread elements and the mesh.

The sole may be configured to be used for a sports shoe. The sports shoe may be a running or tennis shoe. Especially for sports shoes, a lightweight, yet durable, abrasion-resistant and non-skid sole is important.

A further aspect of the present invention relates to a shoe, comprising a sole as described above and a shoe upper connected to the sole.

In the shoe according to the invention, the mesh may extend into the upper. Thus, the connection between the upper and the sole may be made very strong. Forces may be discharged from the upper to the ground directly via the mesh and the tread structure immediately connected thereto.

The mesh may form a part of the upper. Thus, the mesh may be integrated into the upper as described in the previous paragraph. In addition, such a construction may add to the overall visual appearance of the sports shoe.

Yet another aspect of the present invention relates to a method of manufacturing a sole as described above, comprising the steps of providing the porous mesh, arranging the continuous first layer at least partially on the first side of the porous mesh, and molding the first layer and the porous mesh, such that the first layer penetrates the porous mesh at least partially to form the tread structure on the second side of the porous mesh opposite the first side, wherein the first layer and the porous mesh are bonded at least in an area where the tread structure is formed.

In the method according to the invention, the step of molding may comprise compression molding or injection molding. Compression molding is a rather simple method wherein the shoe sole is placed in a mold and formed under pressure and/or heat. With injection molding, the mesh is placed in a mold cavity and the material which is to form the first layer is forced in molten form into the mold cavity. This process can be rather easily automated to achieve a high output of soles.

The method may further comprise the steps of providing a second layer arranged on the second side of the porous mesh, wherein the second layer comprises at least one aperture in which the tread structure is arranged at least partially. In this way, the second layer provides further support for the tread structure and adds to the overall stability and durability of the sole by bonding at least partially to the first layer.

The method may further comprise the steps of providing a continuous third layer arranged on the first layer comprising a different material than the first layer, and bonding the third layer and the first layer at least partially. The third layer adds to the overall stability of the sole. Alternatively or in addition, the third layer may provide further functions to the sole, e.g. damping or thermal insulation.

A still further aspect of the present invention relates to a method of manufacturing a shoe. The method may comprise the steps of providing the sole described above, and connecting the shoe upper to the sole. The method may further comprise the step of connecting the shoe upper to the sole via the mesh.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, embodiments and variations of the present invention are described in more detail.

Figure 1A:
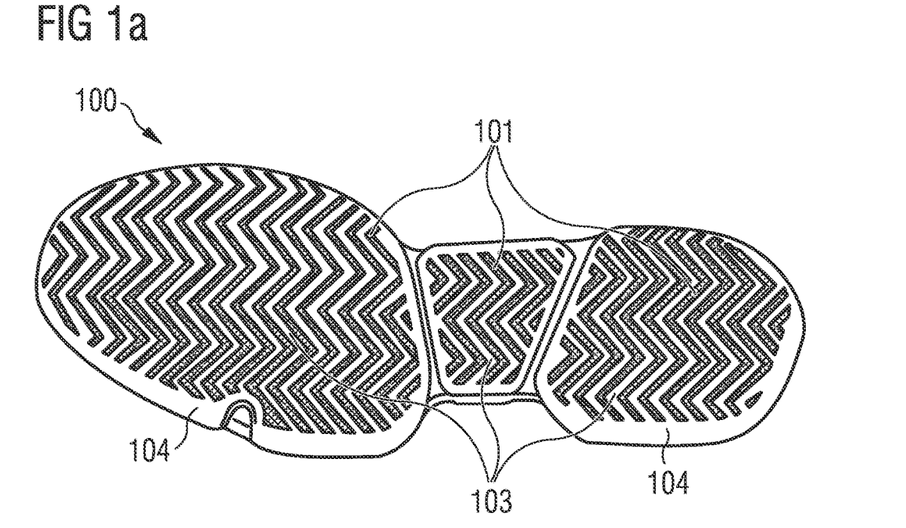
FIGS. 1a and 1b are bottom and top views, respectively, of a sole, according to certain embodiments of the present invention.
Figure 1B:
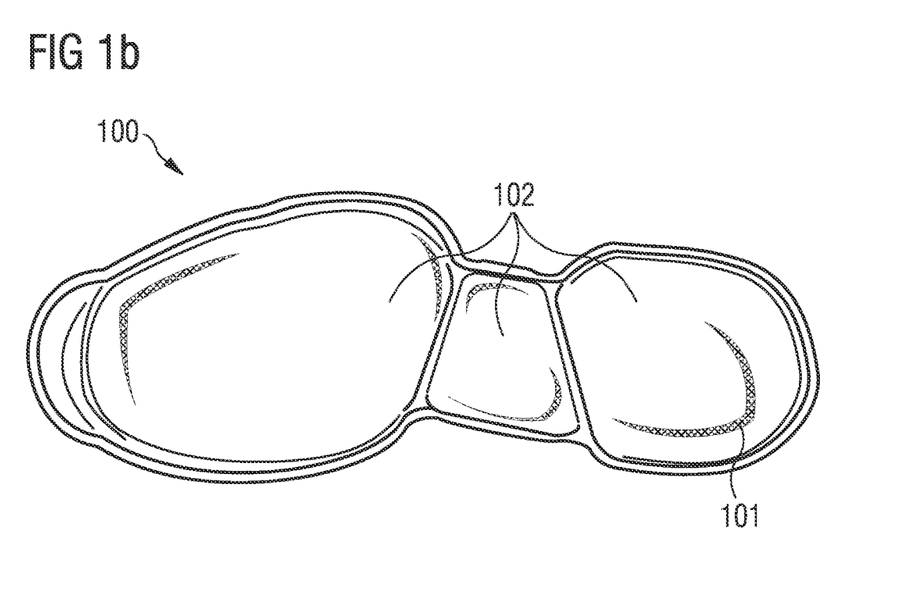

FIGS. 1a and 1b show exemplary embodiments of a sole 100 for a shoe according to the present invention. FIG. 1a is a plan view of the sole 100 from below, i.e. from the ground engaging side, whereas FIG. 1b is a plan view from above, i.e. from the side opposite the ground engaging side where the shoe upper (not shown in FIGS. 1a and 1b) would be located.

The sole 100 is generally configured to be used for a shoe, in particular a sports shoe such as a running or tennis shoe, but can be used for other kinds of sports such as basketball, soccer, cycling, volleyball, etc. as well. The sole 100 may be an outsole or a combination of an outsole and a midsole.

The sole 100 comprises a porous mesh 101. In the exemplary embodiments of FIG. 1, the porous mesh is a textile mesh having a relatively coarse structure, i.e. the mesh openings are rather wide, having a diameter of roughly 1.4 mm. In general, the mesh openings can have a different diameter, such as 1.2 mm to 6 mm. In the specific embodiments shown in FIG. 1, the mesh 101 is a textile made from polyester fibers. Other meshes could be used, e.g. a metal or fabric mesh. The mesh 101 is porous, i.e. the openings of the mesh 101 are penetrable by or permeable to fluid or liquid substances or materials. More specifically, fluid or liquid substances or materials may penetrate the mesh from a first side of the mesh to reach a second side of the mesh opposite the first side.

The sole 100 also comprises a continuous first layer 102 arranged at least partially on a first side of the porous mesh 101. The first layer 102 may be made of rubber, but any other suitable material may be used. As shown in FIG. 1b, the continuous first layer 102 is arranged at least partially on top of the porous mesh 101. The porous mesh 101 is visible in FIG. 1b for example in the heel portion of the sole 100, but need not be visible from above at all, i.e. the first layer 102 may completely cover the porous mesh 101 on the first side of the porous mesh 101. In general, the first layer 102 may be arranged on only a portion of the porous mesh 101. Conversely, there may be a portion of the first layer 102 being not arranged on the porous mesh 101. Thus, the porous mesh 101 and the first layer 102 may generally be in an overlapping configuration. The continuous nature of the continuous first layer 102 may include the continuous first layer 102 being a solid or non-mesh layer, for example, which may be appreciated e.g., with respect to FIG. 1b, where the continuous first layer 102 is depicted as a solid or non-mesh layer, in contrast to the layer of porous mesh 101 shown in FIGS. 1a and 1b.

As shown in FIG. 1a, the first layer 102 penetrates the porous mesh 101 at least partially to form a tread structure 103 on a second side of the porous mesh opposite the first side. Thus, the material forming the tread structure 103 in FIG. 1a is material of the first layer 102 which has penetrated the porous mesh 101 in the area where the tread structure 103 is formed. In other words, the porous mesh 101 is embedded in the first layer where the tread structure is formed. The material of the first layer 102 fills the mesh openings of the porous mesh 102 in the area of the tread structure at least partially. In this way, the first layer 102 and the porous mesh 101 are bonded at least in an area where the tread structure 103 is formed.

As can be seen in FIG. 1a, the average size of the mesh openings formed by mesh fibers is smaller than the average size of the tread elements of the tread structure 103. In more detail, the diameter of a mesh opening is significantly smaller than the length of the elongated tread elements.

In general, the tread structure 103 may have any suitable form to allow for good traction of the sole. Thus, in FIG. 1a a tread structure 103 is shown to have tread elements of an elongated shape, wherein each tread element has a zigzag arrangement and each tread element runs parallel to an adjacent tread element. However, the shape, size and arrangement of tread elements can generally be different. For example, the tread elements can be nub-shaped, star-shaped or the like. Also, tread elements may be separate from each other or may be connected.

Further, the shape, size and arrangement of the tread elements may vary across the sole. For example, the tread elements may be protruding to a greater extent in the areas of the sole with higher stress during use. Also, the tread elements may have a larger size in one area of the sole, e.g. in the heel portion, than in another area of the sole, e.g. in the toe portion.

As depicted in FIG. 1a, the tread elements 103 have gaps in between, and the porous mesh 101 is visible through the gaps. However, the tread structure 103 may also be arranged such that the mesh 101 is not visible.

As depicted in FIG. 1a, the sole 100 comprises a second layer 104 arranged on the second side of the porous mesh 101. The second layer 104 has a ring-like shape and comprises an aperture in which the tread structure is arranged. The second layer 104 and the first layer 102 are bonded at least partially. In the example of FIGS. 1a and 1b, the first layer 102 and the second layer 104 are both made from rubber. Thus, both layers form a tight and stable bond when being molded for example. It is to be noted that the second layer 104 is optional.

Figure 2:
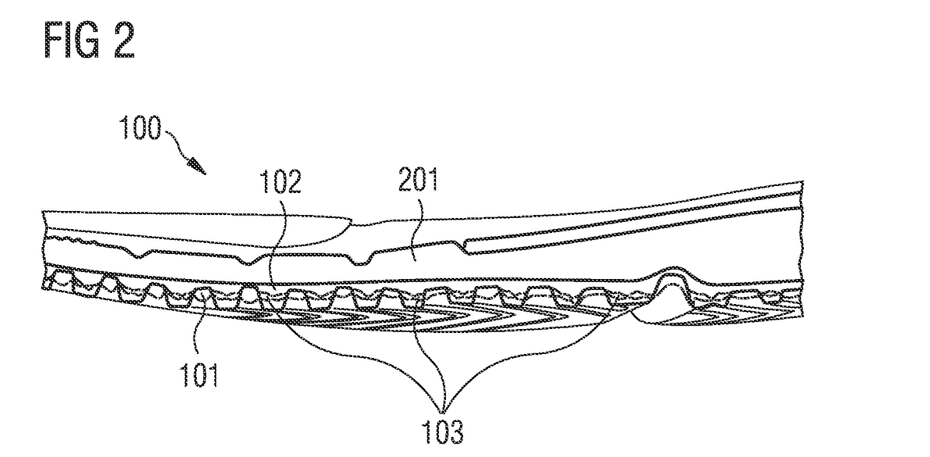
FIG. 2 is a cross-sectional side view of a sole, according to certain embodiments of the present invention.

As shown in the cross-sectional view of FIG. 2, the sole 100 may also comprise a continuous third layer 201 arranged on the first layer 102 comprising a different material than the first layer 102, for example ethylene vinyl acetate, EVA. Another example is polyurethane (PU) which is injected on top of the first layer 102. The third layer and the first layer 102 may be bonded at least partially. As with the continuous first layer 102 as described above, the continuous nature of the continuous third layer 201 may include the continuous third layer 201 being a solid or non-mesh layer.

Figure 3:
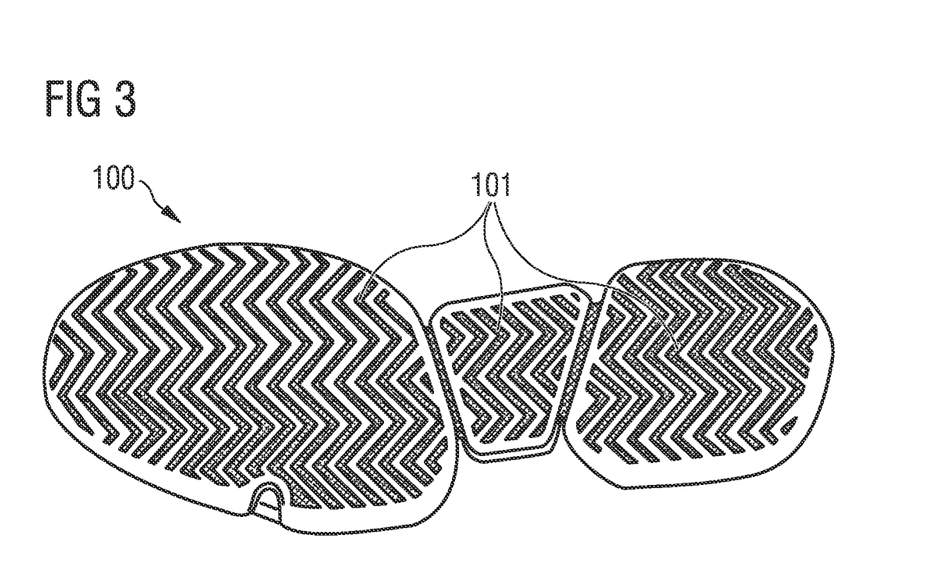
FIG. 3 is a bottom view of a sole, according to certain embodiments of the present invention.

FIG. 3 shows additional exemplary embodiments of a sole 100 according to the invention in which the porous mesh 101 extends throughout the entire sole 100. The mesh 101 extends from the toe portion of the sole 100 via the midfoot portion to the heel portion over the entire width of the sole 100.

Figure 4:
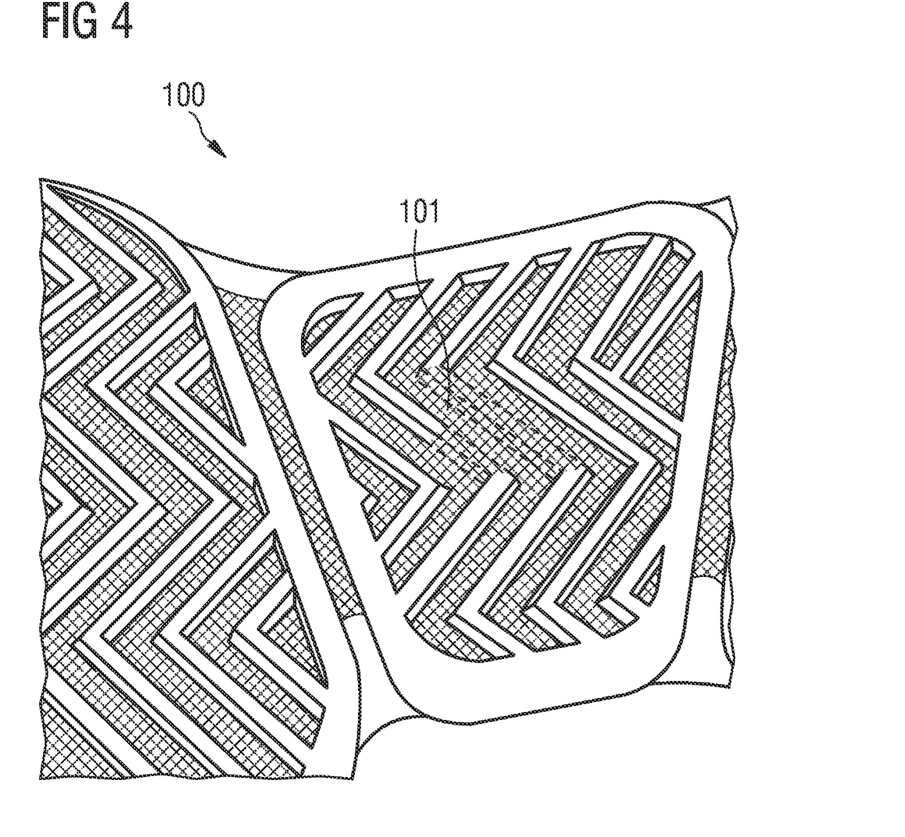
FIG. 4 is a partial bottom view of a sole, according to certain embodiments of the present invention.

FIG. 4 shows further exemplary embodiments of a sole 100 according to the present invention. As shown in FIG. 4, the mesh 101 is folded in the midfoot portion of the sole 100, so that this folded mesh 101 replaces or supplements, i.e. supports a tread element. In general, such folds may be arranged at different locations as well, for example in the forefoot or heel portion of the sole. Also, the number of folds of the mesh 101 may vary.

Figure 5:
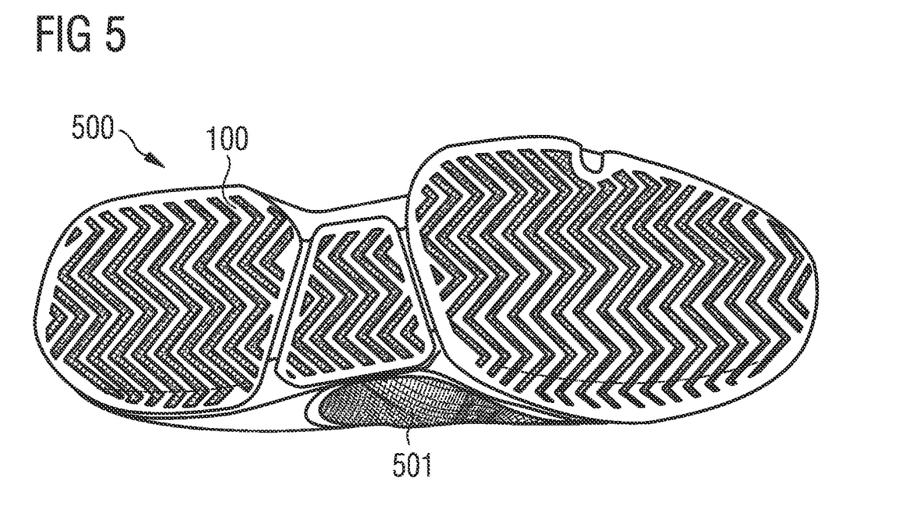
FIG. 5 is a bottom view of a shoe, according to certain embodiments of the present invention.

FIG. 5 shows a bottom view of a shoe 500 according to the invention. The shoe 500 comprises a sole 100 as discussed above and an upper 501. The upper 501 is connected to the sole 100 for example via welding, sewing or gluing.

Figure 6:
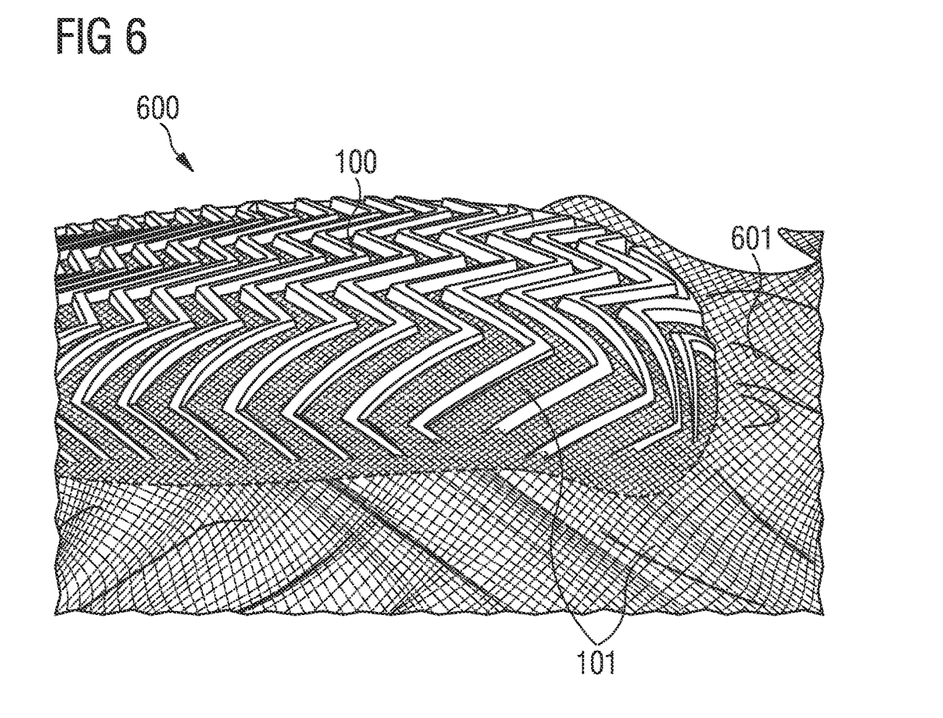
FIG. 6 is a partial perspective view of a shoe, according to certain embodiments of the present invention.

FIG. 6 depicts part of a shoe 600 according to the invention comprising a sole 100 as described above and a part of a shoe upper 601 connected to the sole 100. The mesh 101 of the sole 100 extends into the shoe upper and forms the part of the shoe upper 601. The part of the shoe upper 601 formed by the mesh 101 may be cut to a desired 2-dimensional shape and sewn or welded, for example while the shoe is lasted, to provide the shoe upper with the desired 3-dimensional shape. Other parts may be added to the shoe upper, e.g. a tongue, a heel and toe counter, a lacing system or similar components.

Figure 7A:
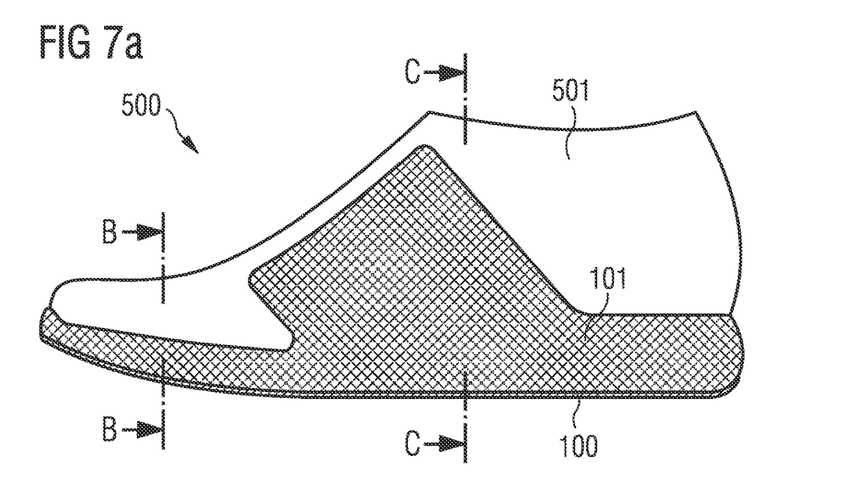
FIG. 7a is a schematic side view of a shoe, according to certain embodiments of the present invention.
Figure 7B:
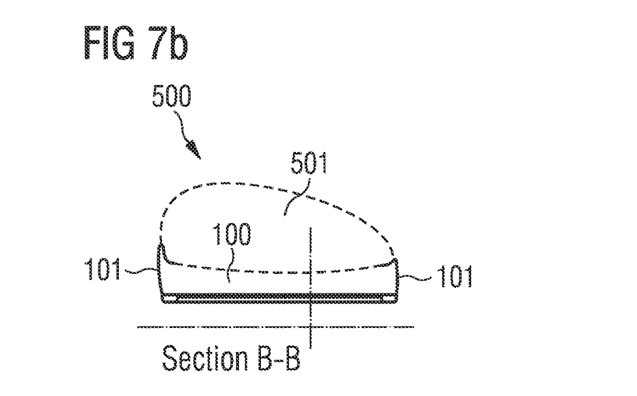
Figure 7C:
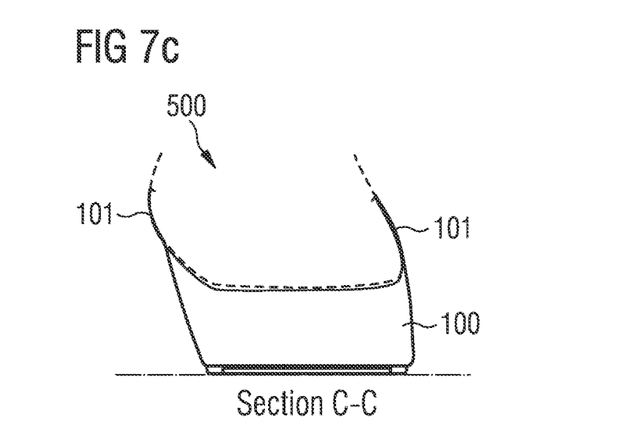
Figure 7D:
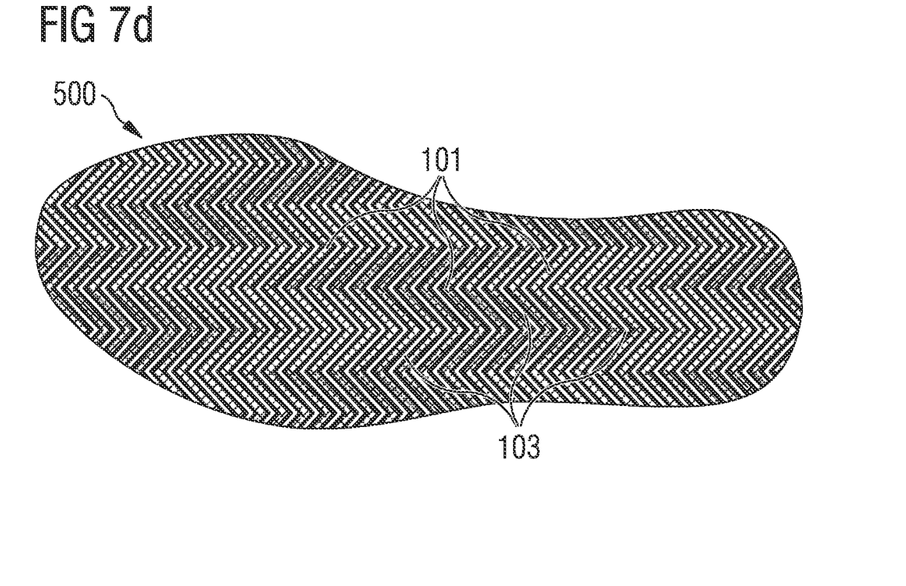

FIG. 7a shows a side view of additional exemplary embodiments of a shoe 500 according to the invention. In the example of FIG. 7a, the mesh 101 extends into the upper 501 in the midfoot portion of the shoe 500 as can also be seen in the cross-sectional view of FIG. 7c. In contrast, the mesh 101 does not extend into the upper 501 in the forefoot portion of the shoe 500 as shown in the cross-sectional view of FIG. 7b. Rather, as shown in FIG. 7b, the mesh 101 covers the sides of sole 100 and is folded over the upper edge of the sole 100 to be covered by the upper 501 in the border area of the sole 100. FIG. 7d shows a bottom view of the shoe 500 shown in FIGS. 7a, 7b and 7c.

Figure 8A:
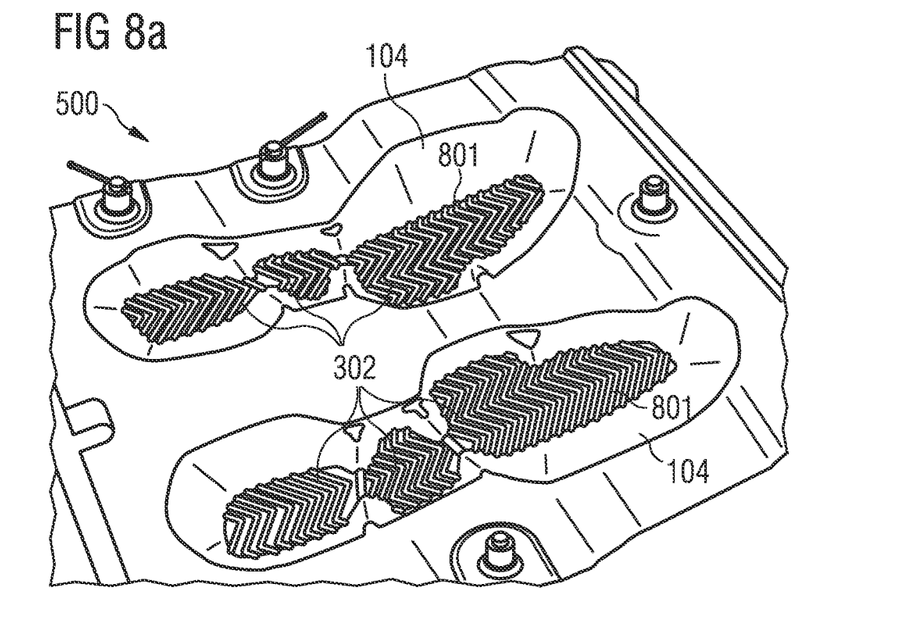
FIGS. 8a, 8b and 8c illustrate a method of manufacturing a sole, according to certain embodiments of the present invention.
Figure 8B:
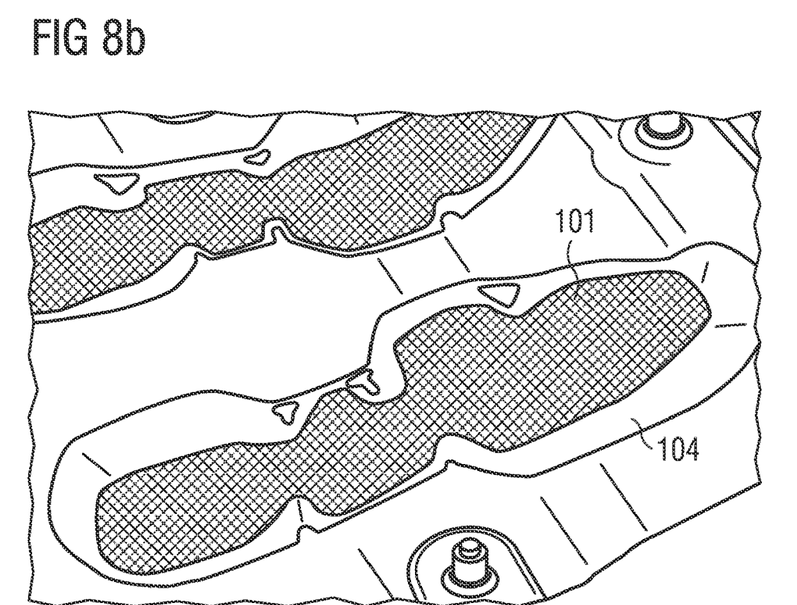
Figure 8C:
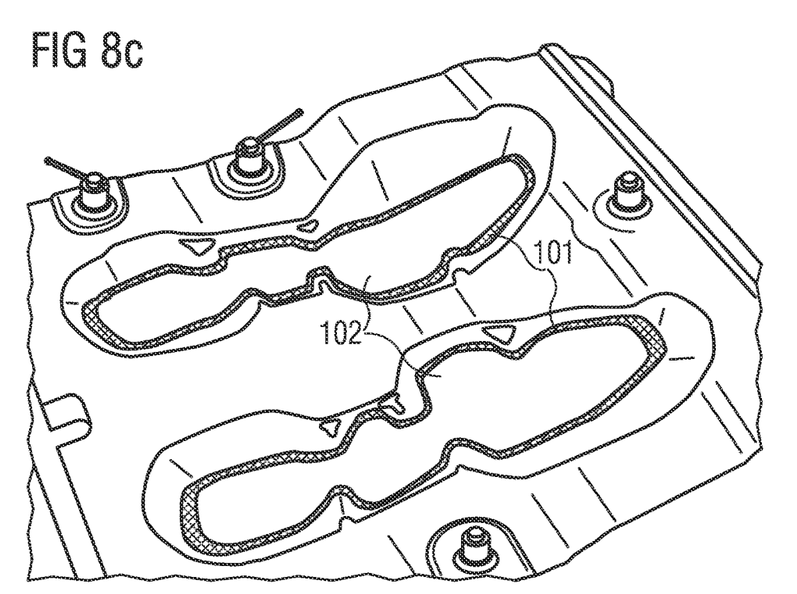

FIGS. 8a, 8b and 8c illustrate an exemplary method of manufacturing a sole 100, which is further described in the following. The exemplary method comprises an optional first step shown in FIG. 8a in which a second layer 104 is provided which will later be arranged on the second side of the porous mesh 101. As depicted in FIG. 8a, the second layer 104 is placed in one half of a mold cavity 801 having a tread structure 802 which will define the tread structure 103 of the final sole 100 and is in fact its negative. The second layer 104 comprises an aperture in which the tread structure 103 of the final sole will be arranged. Thus, the second layer 104 in the exemplary method is ring-shaped and has a thickness of approximately 2 mm. In general, the second layer may have any size and shape. In the exemplary method, the second layer 104 is made from rubber, but may be made from any suitable material, and may also be made from a different material than the first layer 102. It is to be emphasized that providing the second layer 104 is an optional step.

As shown in FIG. 8b, the exemplary method comprises the step of providing the porous mesh 101. In the exemplary method, the mesh 101 is a textile and overlaps the ring-shaped second layer 104 by approximately 5 mm. The mesh 101 is put on the second layer 104 in the half of the mold cavity 801.

As depicted in FIG. 8c, the continuous first layer 102 is arranged at least partially on the first side of the porous mesh 101. In the exemplary method, the first layer 102 is an approximately 2 mm thick rubber piece as large as the aperture of the underlying second layer 104. In general, the first layer 102 may have any size and shape, and may be made from a different material than rubber.

Next, the other half of the mold cavity is arranged to close the mold cavity. Pressure and heat are applied to mold the first layer 102, the optional second layer 104 and the porous mesh 101 by compression molding, such that the first layer 102 penetrates the porous mesh 101 at least partially to form the tread structure 103 on the second side of the porous mesh 101 opposite the first side. Thereby, the first layer 102 and the porous mesh 101 are bonded at least in an area where the tread structure 103 is formed.

Optionally, after the material of the first layer 102, e.g. rubber, has cured, a third layer 201 such as EVA can be applied on top of the first layer 102 in a mold. If the mesh 101 is to extend into the third layer 201, the material of the third layer 201 may penetrate the mesh 101 in this step.

In general, instead of compression molding, injection molding could be used as well. In this case, the mesh 101 is arranged in a suitable mold and the material of the first layer 102 is injected through bores in the mold in liquid form to penetrate the mesh 101 in the area of the tread structure 103.

Injection molding could also be used to apply a third layer 201 such as an EVA or PU layer on top of the first layer 102. In this case, the first layer 102 and the mesh 101 are molded first. After the material of the first layer 102, e.g. rubber, has cured, the material of the third layer 201 such as EVA or PU is applied via injection molding on top of the first layer 102. If the mesh 101 is to extend into the third layer 201, the material of the third layer 201 may penetrate the mesh 101 in this step.

A method of manufacturing a shoe according to the invention comprises at least the steps of providing the sole 100 described above, and connecting a shoe upper to the sole 100. The method may further comprise the step of connecting the shoe upper to the sole 100 via the mesh 101.

In the following, further examples are described to facilitate the understanding of the invention:

1. Sole (100) for a shoe, comprising:
   a. a porous mesh (101); and
   b. a continuous first layer (102) arranged at least partially on a first side of the porous mesh (101), wherein
      1. the first layer (102) penetrates the porous mesh (101) at least partially to form a tread structure (103) on a second side of the porous mesh (101) opposite the first side, and wherein
      2. the first layer (102) and the porous mesh (101) are bonded at least in an area where the tread structure (103) is formed.
2. Sole (100) according to the preceding example, further comprising a second layer (104) arranged on the second side of the porous mesh (101), wherein the second layer (104) comprises at least one aperture in which the tread structure (103) is arranged at least partially, and wherein the second layer (104) and the first layer (102) are bonded at least partially.
3. Sole (100) according to one of the preceding examples, further comprising a continuous third layer (201) arranged on the first layer (102) comprising a different material than the first layer (102), wherein the third layer (201) and the first layer (102) are bonded at least partially.
4. Sole (100) according to one of the preceding examples, wherein the first layer (102) is made of rubber.
5. Sole (100) according to one of the preceding examples, wherein the mesh (101) is made of metal or plastic or fabric.
6. Sole (100) according to one of examples 2 to 5, wherein the second layer (102) is made of rubber.
7. Sole (100) according to one of the examples 3 to 6, wherein the third layer (201) is made of ethylene vinyl acetate, EVA, or polyurethane, PU.
8. Sole (100) according to one of the preceding examples, wherein the tread structure (103) comprises tread elements.
9. Sole (100) according to one of the preceding examples, wherein the average size of the mesh openings formed by mesh fibers are smaller than the average size of the tread elements.
10. Sole (100) according to one of examples 8 to 9, wherein the tread elements have gaps in between and the porous mesh (101) is visible through the gaps.
11. Sole (100) according to one of the preceding examples, wherein the material of the first layer (102) fills the mesh openings of the porous mesh (101) in the area of the tread structure (103) at least partially.
12. Sole (100) according to one of the preceding examples, wherein the sole (100) is configured to be used for a sports shoe.
13. Sole (100) according to the preceding example, wherein the sports shoe is a running or tennis shoe.
14. Shoe (500), comprising:
    a. a sole (100) according to one of the preceding examples; and
    b. a shoe upper (501) connected to the sole (100).
15. Shoe (500) according to the preceding example, wherein the mesh (101) extends into the upper (501).
16. Shoe (500) according to example 15, wherein the mesh (101) forms a part of the upper (501).
17. Method of manufacturing a sole (100) according to one of examples 1 to 13, comprising the steps of:
    a. providing the porous mesh (101);
    b. arranging the continuous first layer (102) at least partially on the first side of the porous mesh (101);
    c. molding the first layer (102) and the porous mesh (101), such that the first layer (102) penetrates the porous mesh (101) at least partially to form the tread structure (103) on the second side of the porous mesh (101) opposite the first side, wherein the first layer (102) and the porous mesh (101) are bonded at least in an area where the tread structure (103) is formed.

18. Method according to the preceding example, wherein the step of molding comprises compression molding or injection molding.

19. Method according to one of examples 17 to 18, further comprising the steps of
providing a second layer (104) arranged on the second side of the porous mesh (101), wherein the second layer (104) comprises at least one aperture in which the tread structure (103) is arranged at least partially.

20. Method according to one of examples 17 to 19, further comprising the steps of
providing a continuous third layer (201) arranged on the first layer (102) comprising a different material than the first layer (102), and bonding the third layer (201) and the first layer (102) at least partially.

21. Method of manufacturing a shoe (500) according to one of examples 14 to 16, comprising the steps of:
a. providing the sole (100); and
b. connecting the shoe upper (501) to the sole (100).

22. Method according to the preceding example, further comprising the step of connecting the shoe upper (501) to the sole (100) via the mesh (101).

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A shoe comprising:
a sole comprising
a porous mesh;
a first layer having a first portion at least partially arranged on a first side of the porous mesh, wherein the first layer has a second portion that at least partially penetrates the porous mesh to form a tread structure on a second side of the porous mesh opposite the first side, wherein the first layer and the porous mesh are fixedly bonded to one another at least in an area where the first layer extends through the porous mesh to form the tread structure, wherein the tread structure comprises tread elements, and wherein the tread elements overlap the second side of the mesh and at least partially encapsulate the mesh between the tread structure and the first portion of the first layer;
a second layer arranged on the second side of the porous mesh, wherein the second layer comprises at least one aperture in which the tread structure is at least partially arranged, and wherein the second layer and the first layer are at least partially bonded; and
a third layer comprising a non-mesh layer arranged on the first layer, wherein the third layer comprises a different material than the first layer, and wherein the third layer and the first layer are at least partially bonded; and
a shoe upper connected to the sole.

2. The sole according to claim 1, wherein the porous mesh extends into the shoe upper.

3. The sole according to claim 2, wherein the porous mesh forms a part of the shoe upper.

4. A method of manufacturing a shoe according to claim 1, comprising:
connecting the shoe upper to the sole.

5. The method according to claim 4, further comprising:
connecting the shoe upper to the sole via the porous mesh.

6. A method of manufacturing a sole comprising a porous mesh and a continuous first layer, comprising:
providing the porous mesh;
arranging the continuous first layer at least partially on a first side of the porous mesh;
molding the first layer and the porous mesh, such that the first layer at least partially penetrates the porous mesh to form a tread structure that overlaps a second side of the porous mesh opposite the first side, wherein the first layer and the porous mesh are bonded at least in an area where the tread structure is formed; and
arranging a second layer on the second side of the porous mesh, wherein the second layer comprises at least one aperture in which the tread structure is at least partially arranged, wherein the second layer and the first layer are at least partially bonded.

7. The method according to claim 6, wherein the step of molding comprises compression molding or injection molding.

8. The method according to claim 6, further comprising:
arranging a continuous third layer on the first layer, wherein the third layer comprises a different material than the first layer; and
at least partially bonding the third layer and the first layer.

9. A sole for a shoe comprising:
a porous mesh;
a continuous first layer having a first portion at least partially arranged on a first side of the porous mesh, wherein the first layer has a second portion that at least partially penetrates the porous mesh to form a tread structure on a second side of the porous mesh, and wherein the first layer and the porous mesh are fixedly bonded to one another at least in an area where the first layer extends through the porous mesh to form the tread structure, wherein the tread structure comprises tread elements, and wherein the tread elements overlap the second side of the mesh and at least partially encapsulate the mesh between the tread structure and the first portion of the first layer; and
a second layer arranged on the second side of the porous mesh, wherein the second layer comprises at least one aperture in which the tread structure is at least partially arranged, and wherein the second layer and the first layer are at least partially bonded.

10. The sole according to claim 9, wherein the second layer is made of rubber.

11. The sole according to claim 9, further comprising a continuous non-mesh third layer arranged on the first layer, wherein the third layer comprises a different material than the first layer, and wherein the third layer and the first layer are at least partially bonded.

12. The sole according to claim 11, wherein the third layer is made of ethylene vinyl acetate, polyurethane, or a combination thereof.

13. The sole according to claim 9, wherein the first layer is made of rubber.

14. The sole according to claim 9, wherein the porous mesh is made of metal, plastic, fabric, or a combination thereof.

15. The sole according to claim 9, wherein an average size of mesh openings formed by mesh fibers in the porous mesh is smaller than an average size of the tread elements.

16. The sole according to claim 9, further comprising gaps located between the tread elements, wherein the porous mesh is visible through the gaps.

17. The sole according to claim 9, wherein material of the first layer at least partially fills mesh openings of the porous mesh in the area where the tread structure is formed.

18. The sole according to claim 9, wherein the sole is configured to be used for a sports shoe.

19. The sole according to claim 18, wherein the sports shoe is a running or tennis shoe.

\* \* \* \* \*